United States Patent [19]
Czapek

[11] 3,785,218
[45] Jan. 15, 1974

[54] COARSE AND FINE ADJUSTMENT MEANS
[75] Inventor: Andre Louis Czapek, Le Perreux, France
[73] Assignee: Societe d'Optique, Precision Electronique et Mechanique-Sopelem, Paris, France
[22] Filed: May 9, 1972
[21] Appl. No.: 251,735

[30] Foreign Application Priority Data
May 24, 1971 France .............................. 71.18559

[52] U.S. Cl........................ 74/479, 74/522, 350/84
[51] Int. Cl............................................. G05g 11/00
[58] Field of Search ................ 74/522, 479; 350/84

[56] References Cited
FOREIGN PATENTS OR APPLICATIONS
12,208  5/1902  Great Britain ....................... 350/84

Primary Examiner—Allan D. Herrmann
Attorney—William B. Kerkam, Jr.

[57] ABSTRACT

A coarse and fine adjustment device especially for focusing a lens system in which both the coarse and fine adjustment are transmitted by two levers pivotally connected together. The coarse or fine adjustment levers are moved by control means which may comprise screw-threaded pins, cam surfaces or an inclined plane acting upon the levers. Only one of the levers is in actual contact with the element to be moved.

7 Claims, 4 Drawing Figures

COARSE AND FINE ADJUSTMENT MEANS

The invention relates to a coarse and fine adjustment device particularly but not exclusively for use in focusing a microscope.

In a microscope, focusing is carried out by producing two movements at widely different rates and of widely different amplitude: one, the fast or coarse movement, whose amplitude is of the order of some tens of millimetres, is for approximate focusing; the other, the slow or fine movement, which is over a shorter distance (at most a few millimetres), is highly reduced and permits focusing with a precision of a fraction of a micron.

In the prior art these two movements generally act on two different guides or slides which may or may not be superimposed. However, it is becoming common for both movements to act on a single slide, since this obviously increases the eventual rigidity of the movable element and also simplifies the microscope mechanically. Existing solutions for combined fast and slow movements acting on a movable element guided by a single slide are of two types:

1. reduction of the coarse movement control;
2. micrometric adjustment of the coarse movement control.

These solutions have the following principal disadvantages: The coarse control must be coupled precisely to the movable element in solutions of type 1), to obtain the maximum benefit from the fine slow movement; and precise auxiliary guiding means are required for the coarse movement control.

An object of the invention is to provide a solution which does not have the disadvantages of the known devices.

Accordingly there is provided a coarse and fine adjustment device comprising first and second levers in pivotal relationship to each other and to a base frame, each lever being adapted to be operated by a separate control means engaging said base frame to transmit a coarse or fine adjustment to a movable element, wherein said levers act as multiplying or reducing members for their respective control means.

In one embodiment, the controls for the levers comprise screws attached to the stand.

In another embodiment of the invention, the coarse movement is controlled by means of an inclined plane moving beneath the coarse movement transmission lever, and the fine movement is controlled by means of a screw.

In a further embodiment of the invention, the coarse and fine movements are produced by means of cams.

Advantageously, according to one feature of the invention, the joint supporting the assembly comprising the two levers is formed by a resiliently deformable system of the spring hinge type.

Further features and advantages of the invention will arise out of the ensuing description which illustrates, by way of example only, various embodiments of the invention with reference to the accompanying drawings.

Figure 1:
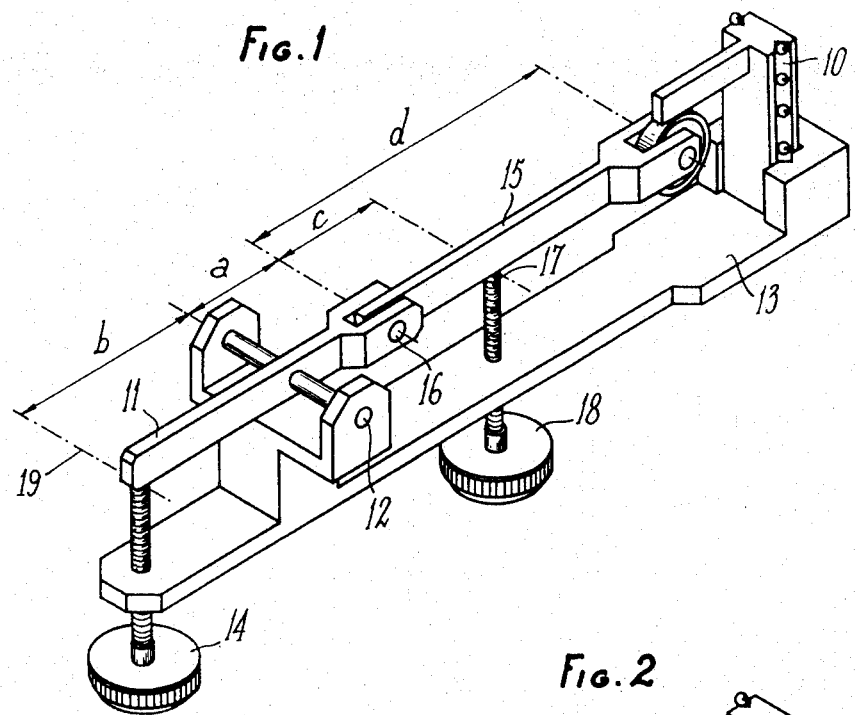
FIG. 1 is a diagrammatic perspective view of a first embodiment of the invention.

In the drawings reference 10 designates a movable element, which may for example be a stage, a revolving nose-piece or the eyepiece/objective assembly, guided by a straight slide. A first lever 11, for producing the slow or fine movement, is pivoted on the fixed portion or stand 13 by means of a pivot pin 12. The movements of this lever (with the object of producing fine movement of the movable element 10) are controlled in this embodiment by a screw 14.

A second lever 15 is pivoted on the lever 11 by means of a pin 16. It bears on a point 17 at which the control means act on this lever 15. The control means in this example are a screw 18 attached to the stand 13. This lever 15 controls the movement of the slide-guided movable element 10.

The device operates as follows.

1. Coarse movement

Operation of the control 18 causes the lever 15 to turn on the pivot pin 16, which at this moment is fixed, and moves the element 10 by a distance:

$$X = x(d/c)$$

$x$ being the movement due to the control 18,
$d$ being the length of the lever 15, and
$c$ being the distance separating the point 17 at which the control acts on the lever 15 from the pin 16.

2. Fine movement

Operation of the control 14 causes the lever 11 to turn on the pin 12 mounted on the stand 13. The joint 16, common to the levers 11 and 15 therefore moves. This movement is transmitted to the movable element 10 by the lever 15, which pivots about the point 17 at which the coarse control 18 acts, this point now being fixed. The movement Y of the movable element 10 corresponding to movement $y$ of the control 14 is then:

$$Y = y(a/b) \times (d-c/c)$$

$a$ being the distance between the pivot pins 12 and 16, and
$b$ being the distance separating the pin 12 from the point 19 at which the control 14 acts on the lever 11.

The levers 11 and 15 make it possible not only to transmit the coarse and fine movements to the movable element 10 without any play, but also to select the desired reduction ratios for the controls 14 and 18. In general a transmission ratio of at least unity will be selected for the fast movement. For the slow movement, on the other hand, the transmission ratio may be less than or equal to unity, which permits simplification of the control 14.

Figure 2:
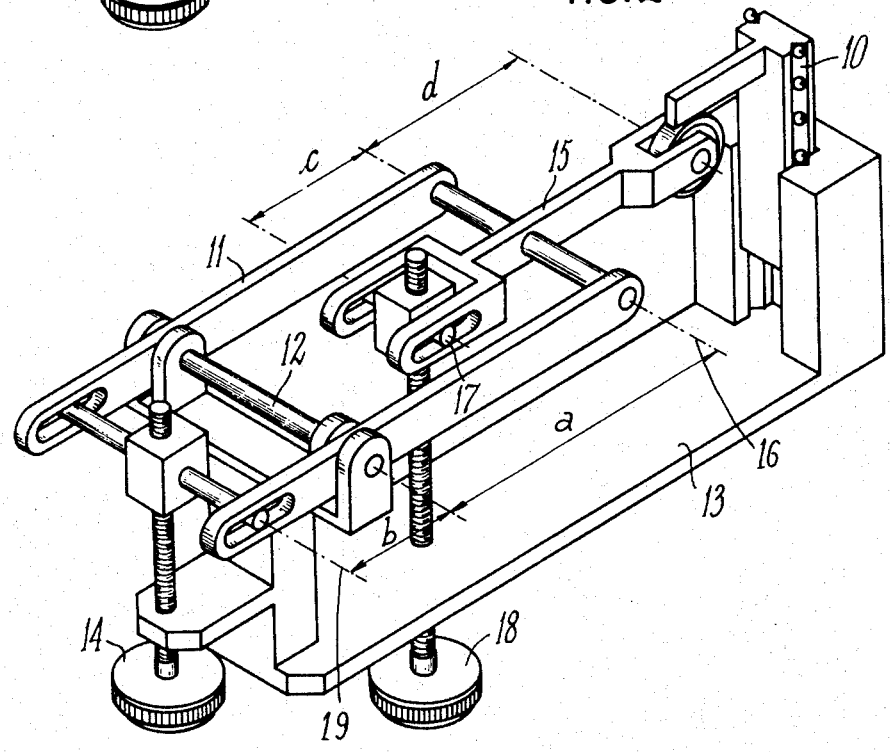
FIG. 2 is a perspective view of a variant of the embodiment shown in FIG. 1.

A variant of the embodiment described above with reference to FIG. 1 is illustrated in FIG. 2. Since this variant differs from the embodiment shown in FIG. 1 only in the shape of the levers 11 and 15 and in the various joints, it will not be described.

Figure 3:
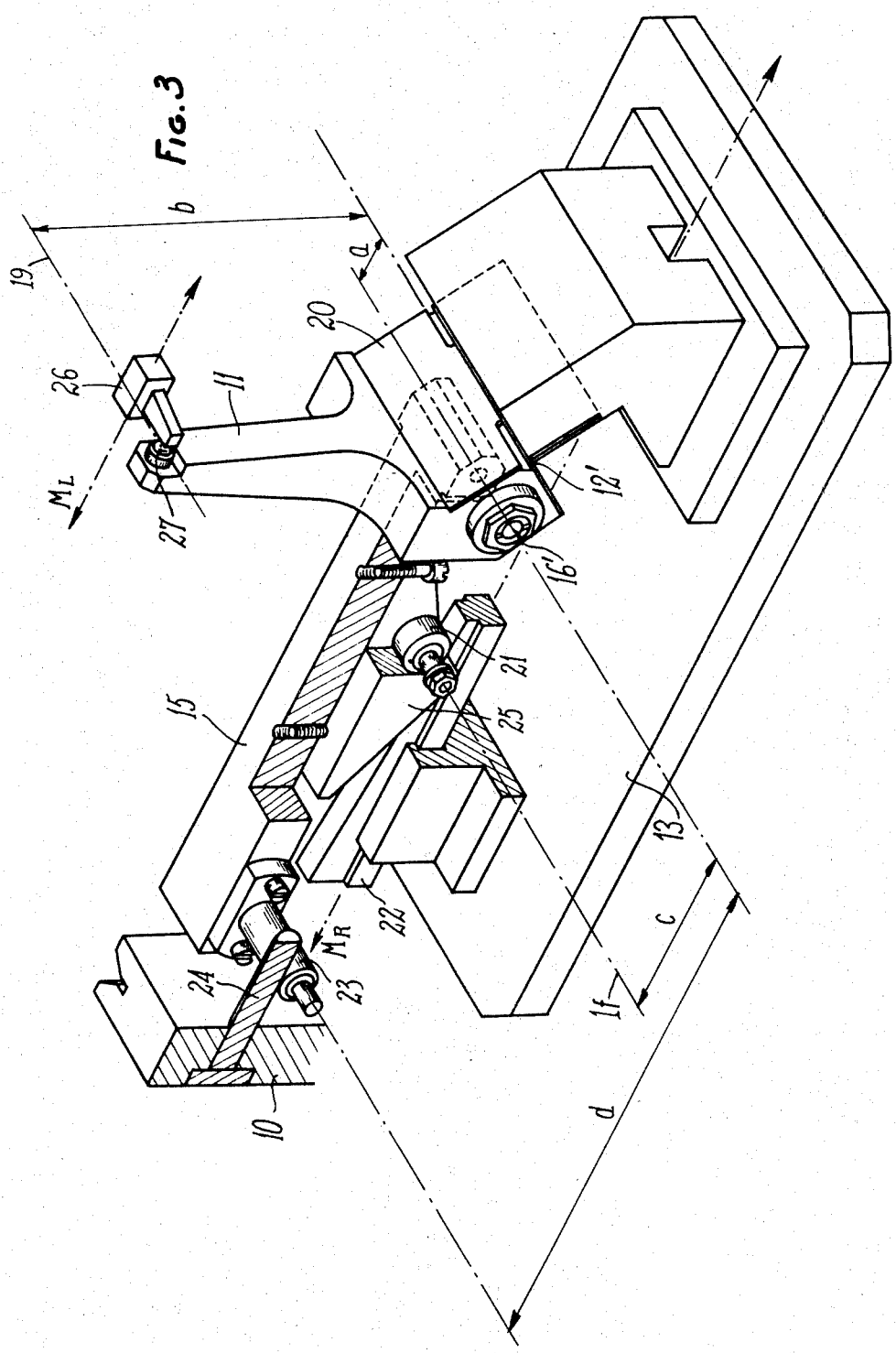
FIG. 3 is a perspective view of a second embodiment.

In the embodiment shown in FIG. 3, the coarse movement (arrow $M_R$) is controlled by means of an inclined plane, or wedge 22, moving beneath a roller 21 mounted on an element 25 attached to the lever 15. The lever 15 transmits this coarse movement to the element 10 by way of a roller 23 mounted on the end of the lever 15 and a pin 24 fixed to the movable element.

The fine movement control comprises a simple screw, represented diagrammatically by the arrow $M_L$, moving a block 26 which bears on an abutment 27 mounted on the end of the lever 11.

In this embodiment the joint 12' (equivalent to the pin 12 in FIGS. 1 and 2) which supports the assembly comprising the two levers 11 and 15, and which must therefore be very rigid and permit only slight rotation, may advantageously comprise a resiliently deformable system of the spring hinge type, formed for example by an assembly of two leaves such as 20.

Figure 4:
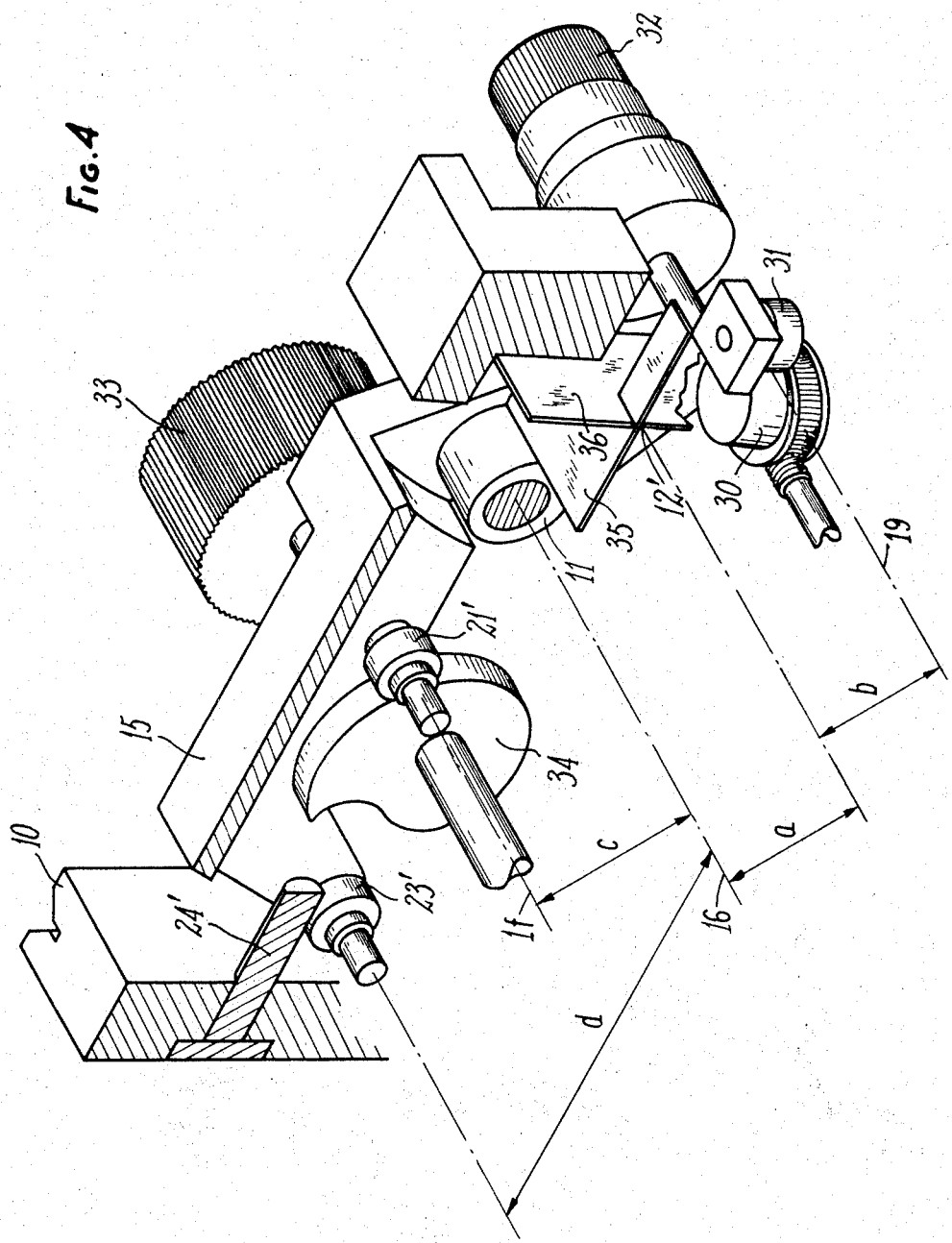
FIG. 4 is a perspective view of another embodiment of the invention.

In the embodiment shown in FIG. 4 the coarse and fine movements are controlled by cams 34 and 30 respectively. The lever 15 bears on the cam 34 (which is operated by a control 33) by way of the roller 21'. To avoid transmitting undesirable movements to the movable element 10, the lever 15 acts on this element by way of an idle roller 23'.

A roller 31 mounted on the lever 11 bears on a cam 30 rotated by a worm and worm-wheel operated by a knob 32. In this embodiment the joint 12' is a spring hinge composed of leaves 35 and 36.

I claim:

1. A coarse and fine adjustment device for a movable element comprising a first lever acting at one extremity on the movable element, said first lever being articulated about an adjustable first axis for coarse adjustment of the movable element, a second lever in pivotal relationship with said first lever and pivoted to a base frame, and control means for said second lever engaging said base frame for fine adjustment to the movable element.

2. A device as claimed in claim 1 wherein one of said levers being pivoted to the base member by a pivot pin the other of said levers contacting the movable element.

3. A device as claimed in claim 1 including a resiliently deformable spring hinge assembly supporting said levers.

4. A device as claimed in claim 1 said control means being a screw threaded element.

5. A device as claimed in claim 1 the adjustable first axis of said first lever being controlled by an inclined plane member.

6. A device as claimed in claim 1 wherein at least one of said levers is controlled by cam means.

7. A device as claimed in claim 1 wherein said first lever acts on the movable element through an idle roller.

* * * * *